July 25, 1933.  S. RUBEN  1,920,151

POTENTIAL PRODUCING CELL

Filed April 22, 1933

INVENTOR
SAMUEL RUBEN
BY
ATTORNEY

Patented July 25, 1933

1,920,151

UNITED STATES PATENT OFFICE

SAMUEL RUBEN, OF NEW ROCHELLE, NEW YORK

POTENTIAL PRODUCING CELL

Application filed April 22, 1933. Serial No. 667,491.

This invention relates to a device for producing a constant potential and this application is a continuation in part of my pending application Ser. No. 633,607 filed September 17, 1932.

An object of the invention is to provide a potential producing cell having no appreciable internal chemical action for the production of current and having a long life.

Another object is the provision of a cell for producing a constant potential in which the electrodes, particularly the cathode, are substantially unaffected and not consumed by the electrolyte.

A specific object is the provision of a device for negatively biasing the grid or control element of electron discharge tubes or other electrostatically operated devices requiring no current; to provide a device of this character which suffers no material change or deterioration in performance due to local or shelf action.

Other objects will be apparent from the disclosure.

Broadly, the invention utilizes the contact potential difference between electrodes of an electro positive material such as aluminum and an electronically conductive relatively electro-negative material such as iron oxide, with a non-reacting electrolyte in which the cathode is not substantially soluble, such as ethylene glycol or glycerine.

Figure 1:
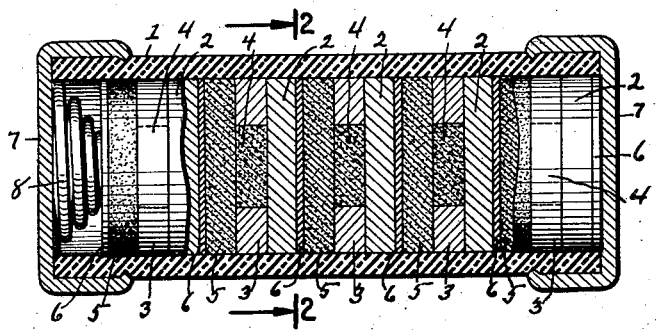
Figure 2:
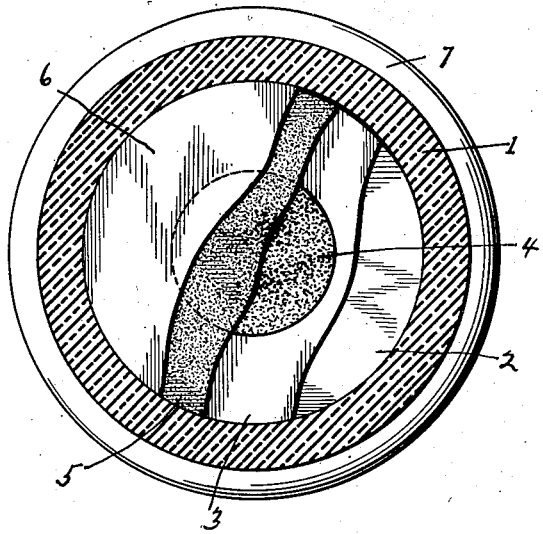

A typical cell is shown in the accompanying drawing illustrating an embodiment of my invention, Fig. 1 showing a device partially cut away and Fig. 2 showing a sectional view on line 2—2.

Heretofore, where a line potential has not been used, a primary battery has been employed for negatively biasing the grids of vacuum tubes. These batteries have the disadvantage of deteriorating with and without use, the cathode chemically reacting with the electrolyte at all times. The consequent decrease in potential means a loss of usefulness, irrespective of the fact that a negatively biased grid circuit is not required under normal conditions, to supply direct current.

In the present invention, I employ as the cathode, a material which is preferably highly electro-positive, for instance, aluminum, magnesium, beryllium, cadmium, zinc or an alloy or amalgam of one or more of these metals. As the anode, I employ an electronically conductive material which is relatively electro-negative with respect to the cathode. Among the materials suitable for such use may be mentioned the electronically conductive oxides, for instance a copper oxide such as cuprous oxide, an iron oxide such as the black magnetic oxide of iron, a lead oxide such as lead peroxide, a vanadium oxide such as the vanadium pentoxide, cadmium oxide; also, carbon, carbonized nickel, carbonized iron, the conductive carbides, etc.

The contact potential built up is dependent upon the electro-chemical dissimilarity between the cathode and anode materials with a given electrolyte.

For the organic electrolyte, which is preferably slightly acidic and which serves as the sole electrical contacting means between the cathode and anode and which is preferably housed in a porous absorbent medium, I prefer a viscous polyhydric alcohol falling within the classes glycols and glycerols. This electrolyte should be substantially free of reactive salts, acids or alkalis in order to avoid injurious local action.

Ethylene glycol is preferred for this use. Its electro-chemical character of low ionization and its low vapor pressure permits its absorption by a filler material such as an absorbent paper. It has a further value because it retains its viscous or liquid state with substantially no drying out, a viscous or plastic electrolyte being highly desirable. Benzols, acetones and other non-reactive organic electrolytes may also be used in combination with electrodes with which they do not react.

In the present invention, no observable chemical reaction takes place between the electrolyte and cathode; if one does take place, it is of such negligible character as to be not harmful and of no substantial effect toward shortening the life of the cell, which life appears to be practically limitless. In the battery art, the function of the cathode has been that of generating a potential and current supply by virtue of its electro-chemical decomposition by and its combining with the electrolyte. Thus, zinc dissolves into ammonia chloride or sulfuric acid to form zinc chloride or zinc sulfate, the current generated governing the rate of cathode consumption. For this reason, a chemically reactive salt is necessary to generate a current of any practical magnitude. The device of my invention distinguishes from electrolytic condensers in several ways. These condensers involve ionic action by the effect of applied potentials. The ionic movement or direction is dependent upon the potential or polarity applied. In the present device, the ionic action is due to hydrogen or hydroxyl ion content of the electrolyte and the electro-chemical dissimilarity of materials. The rate of ionic movement is due to generated potential difference and loss of charge. Electrolytic condensers, under the influence of potentials, develop a polarized insulating condition of the anode whereas in the present device, no polarized anode insulating condition obtains. In electrolytic condensers the anode is the electro-positive element as distinguished from the electro-negative element of the present device. It is also well known in the electrolytic condenser art that the electrodes should be similar or as nearly similar as possible in order to avoid electro-potential effects.

The function of the cell of this invention is only to produce a potential and it is of use chiefly where electrostatic control is desired. This is due to the substantially chemically non-reactive character of the electrolyte, its limited ionization and high specific resistance. An attempt to discharge current through it would result in the complete elimination of potential as the electrolyte could not electro-chemically dissolve or react with the cathode at an appreciable rate.

In the cell of my invention, the internal resistance of the cell is sufficiently high to prevent any appreciable current flow. This precludes the use of the cell as a current supply source, that is, as a primary battery cell. This difference may be further emphasized by comparison of the relative resistance values of the electrolyte. The electrolyte of my invention has a resistance many thousands of times that of the electrolyte of the usual primary cell. This is apparent when the resistances of electrolytes used in the various voltaic cells such as the Edison-Lalande, Daniell, gravity, silver chloride, dry cell, Leclanché, Grove, Bunsen, bichromate, storage, Clark or Weston.

Under ordinary applications, the use of ethylene glycol or glycerine is ample. When a high potential is to be produced by a large number of couples in series, it may be of advantage to use an electrolyte of the glycol borate or glycerol borate classes, or other similar compound. Such an eletrolyte may be formed by heating boric acid in ethylene glycol or glycerine until completely dissolved, when the glycol or glycerol borate is probably formed. I have been able to add as high as twenty per cent boric acid to ethylene glycol for this purpose, but prefer to keep the proportion around five per cent.

The addition of the borate allows a slight increase in ionization of the electrolyte which compensates for surface leakage effect which may develop when a number of units are operated in series.

When permanent or long life of the cell is not a primary requisite, a very small or fractional per cent of one of the weak organic acids, such as lactic, malic, tartaric, may be used instead of the boric acid, to form a corresponding slightly acidic polyhydric alcohol compound. While the cathode is not materially attacked or reduced if the percentage of such acid is low enough, there is eventually some small attack and dissolution.

As magnesium is not chemically attacked by alkaline solutions, a cell can also be constructed by using a cathode of magnesium or other suitable material and substituting a somewhat viscous alkaline solution for the glycol or glycerol borate. I have constructed cells of this type and found them satisfactory. One of the most efficient, is a cell comprising an anode of lead peroxide, an electrolyte of an alkaline sodium silicate solution and a cathode of magnesium.

In Figures 1 and 2 of the drawing, a tube (1) constructed of fibre or other suitable material houses a series of voltaic cells each composed of aluminum cathode discs (2), vanadium pentoxide anode (5) and ethylene glycol (containing about 5% boric acid) impregnated cotton plugs (4) which afford the necessary electrical contact between the cathode (2) and the anode (5). The plugs (4) are disposed within sealing washers (3) which are of rubber, paraffined paper or other material adapted to prevent leakage of the glycol or absorption of moisture from the atmosphere. Lead washers (6) space and contact the couples which are maintained under constant pressure by a spring (8) and metal caps (7) which close the device.

I may substitute for each ethylene glycol impregnated cotton plug, a plug or disc of paper or cloth impregnated with ethylene glycol or I may use a disc or plug of regenerated cellulose sheet material, such as is popularly designated "cellophane", which has been plasticized or impregnated with a heavy glycerine or glycol content.

The voltage output of the device is dependent upon the number of couples in series. For variable voltages, the device may be tapped at different points.

The areas of the junctions are such that when in an alternating current circuit, as in the biasing of an audio amplifier, the interelement capacity of the couple is adequate to introduce a reactance in the grid circuit.

When the device is used as a grid biasing battery in a vacuum tube circuit, it is possible to dispense with the grid leak element.

I claim:

1. A potential supplying battery, comprising a cathode composed of at least one element chosen from the empirical group including aluminum, zinc, magnesium, beryllium and cadmium, an anode of an electronically conductive material electro negative with respect to said cathode, and a contacting electrolyte chosen from the class comprising glycol borates and glycerol borates.

2. In a voltage operated apparatus requiring substantially no current, a potential supplying battery, comprising a cathode composed of at least one element chosen from the empirical group including aluminum, zinc, magnesium, beryllium and cadmium, an anode composed of an electronically conductive oxide of vanadium, and a contacting organic electrolyte with which the cathode does not substantially chemically react, the cathode being substantially insoluble in said electrolyte, said cell having no appreciable internal chemical action for the production of current.

3. A potential supplying battery, comprising a cathod composed of at least one element chosen from the empirical group including aluminum, zinc, magnesium, beryllium and cadmium, an anode chosen from the group of oxides comprising lead peroxide, iron oxide, cadmium oxide, vanadium pentoxide and cuprous oxide, and a contacting electrolyte composed substantially of a glycol compound.

4. A potential supplying battery, comprising a cathode formed from aluminum, an anode of lead peroxide, and a contacting electrolyte composed substantially of a glycol compound.

5. A potential supplying battery, comprising a cathod composed of at least one element chosen from the empirical group including aluminum, zinc, magnesium, beryllium and cadmium, an anode chosen from the group of oxides comprising lead peroxide, iron oxide, vanadium pentoxide, cadmium and cuprous oxide, and a contacting electrolyte composed substantially of a compound of the group comprising glycol and glycerol borates.

6. A potential supplying battery, comprising a cathode of aluminum, an anode of lead peroxide, and a contacting electrolyte composed substantially of a compound of the group comprising glycol and glycerol borates.

7. A potential supplying battery comprising a cathode of aluminum, an anode of vanadium pentoxide, and a contacting electrolyte composed substantially of glycol borate.

8. A potential supplying battery comprising a cathode of aluminum, an anode of iron oxide, and a contacting electrolyte composed substantially of glycol borate.

9. A potential supplying battery for voltage operated devices requiring no substantial current, comprising a cathode composed of at least one element chosen from the empirical group including aluminum, zinc, magnesium, beryllium and cadmium, an anode of an electronically conductive material of the group comprising the electronically conductive oxides and carbides, carbon and its conductive compounds, and a contacting electrolyte, chosen from the group of organic compounds comprising ethylene glycol, glycerine, glycol borate and glycerol borate, said cell having no appreciable internal chemical action for the production of current.

10. A battery comprising a cathode, an electrolyte and an anode of an electronically conductive oxide of vanadium.

11. A potential supplying battery cell for voltage operated devices requiring no substantial current, comprising a cathode composed of at least one element chosen from the empirical group including aluminum, zinc, magnesium, beryllium and cadmium, an anode of an electronically conductive material of the group comprising the electronically conductive oxides and carbides, carbon and its conductive compounds, and a contacting electrolyte chosen from the group of organic compounds comprising ethylene glycol, glycerine, glycol borate and glycerol borate, said cell having no appreciable internal chemical action for the production of current, said cell being sealed to prevent leakage of the electrolyte.

12. A potential supplying battery for voltage operated devices requiring no substantial current, comprising a series of sealed cells, each cell composed of a cathode composed of at least one element chosen from the empirical group including aluminum, zinc, magnesium, beryllium and cadmium, an anode of an electronically conductive material of the group comprising the electronically conductive oxides and carbides, carbon and its conductive compounds, and a contacting electrolyte chosen from the group of organic compounds comprising ethylene glycol, glycerine, glycol borate and glycerol borate, said cell having no appreciable internal chemical action for the production of current.

SAMUEL RUBEN.